United States Patent [19]

Csurgay et al.

[11] 4,289,219

[45] Sep. 15, 1981

[54] CONTROL SYSTEM FOR VEHICLE BRAKE VALVE

[75] Inventors: Gregory Csurgay; Willes W. Reeder, both of Fort Lauderdale, Fla.

[73] Assignee: Fail Safe Industries, Inc., Lantana, Fla.

[21] Appl. No.: 90,759

[22] Filed: Nov. 2, 1979

[51] Int. Cl.³ .............................................. B60K 41/20
[52] U.S. Cl. .................................... 192/2; 192/3 TR; 192/9; 192/3 G; 303/119
[58] Field of Search ................ 192/4 A, 9, 3 G, 3 TR, 192/1, 2; 180/287; 303/3, 93, 113, 119; 251/133; 188/162, 181 R

[56] References Cited

U.S. PATENT DOCUMENTS

| | | | |
|---|---|---|---|
| 2,813,603 | 11/1957 | Balass | 192/1 |
| 3,137,475 | 6/1964 | Schoenecker et al. | 251/133 X |
| 3,434,575 | 3/1969 | Mizuno | 192/3 TR |
| 3,763,975 | 10/1973 | Fontaine | 192/3 TR |
| 3,893,698 | 7/1975 | Fontaine | 192/3 TR |
| 3,895,698 | 7/1975 | Fontaine | 192/3 TR |

FOREIGN PATENT DOCUMENTS 531728  10/1956  Canada .............................. 192/3 TR Primary Examiner—George H. Krizmanich
Attorney, Agent, or Firm—Oltman and Flynn

[57] ABSTRACT

This invention relates to a control system for use on an automotive vehicle in conjunction with a valve in the vehicle's hydraulic brake system to control certain aspects of the braking operation. Preferably, the present control system insures that the brakes will be locked to prevent the vehicle from creeping forward after being braked to a stop, such as at a stop light. Also, the present control system preferably insures that the brakes will be locked after the engine has been turned off, so as to prevent the car from being stolen.

29 Claims, 9 Drawing Figures

CONTROL SYSTEM FOR VEHICLE BRAKE VALVE

SUMMARY OF THE INVENTION

This invention relates to a control system for use on an automotive vehicle in conjunction with a valve in the vehicle's hydraulic brake system to control certain aspects of the braking operation. Preferably, the present control system insures that the brakes will be locked to prevent the vehicle from creeping forward after being braked to a stop, such as at a stop light. Also the present control system preferably insures that the brakes will be locked after the engine has been turned off, so as to prevent the car from being stolen.

A principal object of this invention is to provide a novel and improved control system for the hydraulic brake system of an automotive vehicle.

Another object of this invention is to provide such a control system having novel provision for establishing a "creep control" mode in the hydraulic brake system under appropriate circumstances.

Another object of this invention is to provide such a control system having novel provision for establishing an "anti-theft" mode in the hydraulic brake system under appropriate circumstances.

Another object of this invention is to provide such a control system having novel provision for establishing both "creep control" and "anti-theft" modes in the hydraulic brake system under different circumstances.

Another object of this invention is to provide a control system for use with a brake system as disclosed in U.S. patent application of Gregory Csurgay, Ser. No. 090,757 filed Nov. 2, 1979, entitled High Pressure Multi-Function, Sealed Valve assigned to the same assignee as the present invention (and now sending). Reference is also made to U.S. patent application Ser. No. 090,760 filed Nov. 2, 1979 entitled Selectively Operable Control System For Vehicle Brake Valve assigned to the same assignee as the present invention (and now sending).

Further objects and advantages of this invention will be apparent from the following detailed description of a presently-preferred embodiment thereof, which is shown in the accompanying drawings.

Before explaining the disclosed embodiment of the present invention in detail, it is to be understood that the invention is not limited in its application to the details of the particular arrangement shown since the invention is capable of other embodiments. Also, the terminology used herein is for the purpose of description and not of limitation.

HYDRAULIC BRAKE SYSTEM

Figure 3:
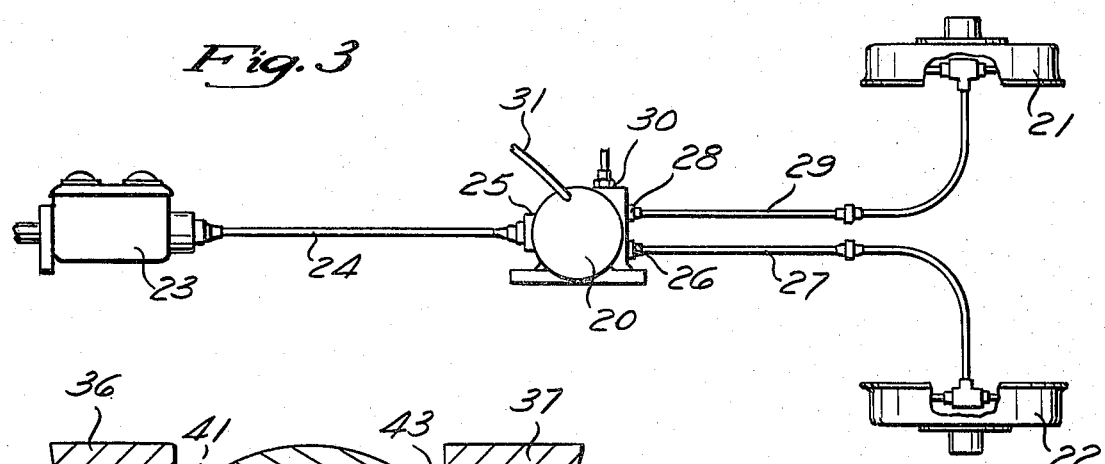
FIG. 3 shows schematically the hydraulic brake system on a vehicle having a brake valve whose operation is controlled by the present control system.

The present control system may be used with a brake system on an automatic vehicle, as shown in FIG. 3. As described in detail with reference to FIGS. 4–9, the brake system includes a valve 20 controlled by an electric motor and a solenoid to provide:

(1) normal braking operation; or
(2) creep control operation; or
(3) anti-theft operation.

The brake system and its control valve are disclosed in the aforementioned U.S. patent application of Gregory Csurgay.

Referring to FIG. 3, the brake system has a left front brake 21 and a right front brake 22. The master cylinder 23 of the brake system is connected by a hydraulic line 24 to the inlet port 25 of the valve 20. A first outlet connection 26 of the valve 20 is connected by a line 27 to the right front brake 22. A second outlet connection 28 of the valve 20 is connected by a line 29 to the left front brake 21. A third outlet connection 30 for the valve 20 is connected to a pressure switch (not shown). Lead wires 31 are provided for making electrical connections to the valve, and the openings in the valve from which these wires extend are sealed.

Figure 6:
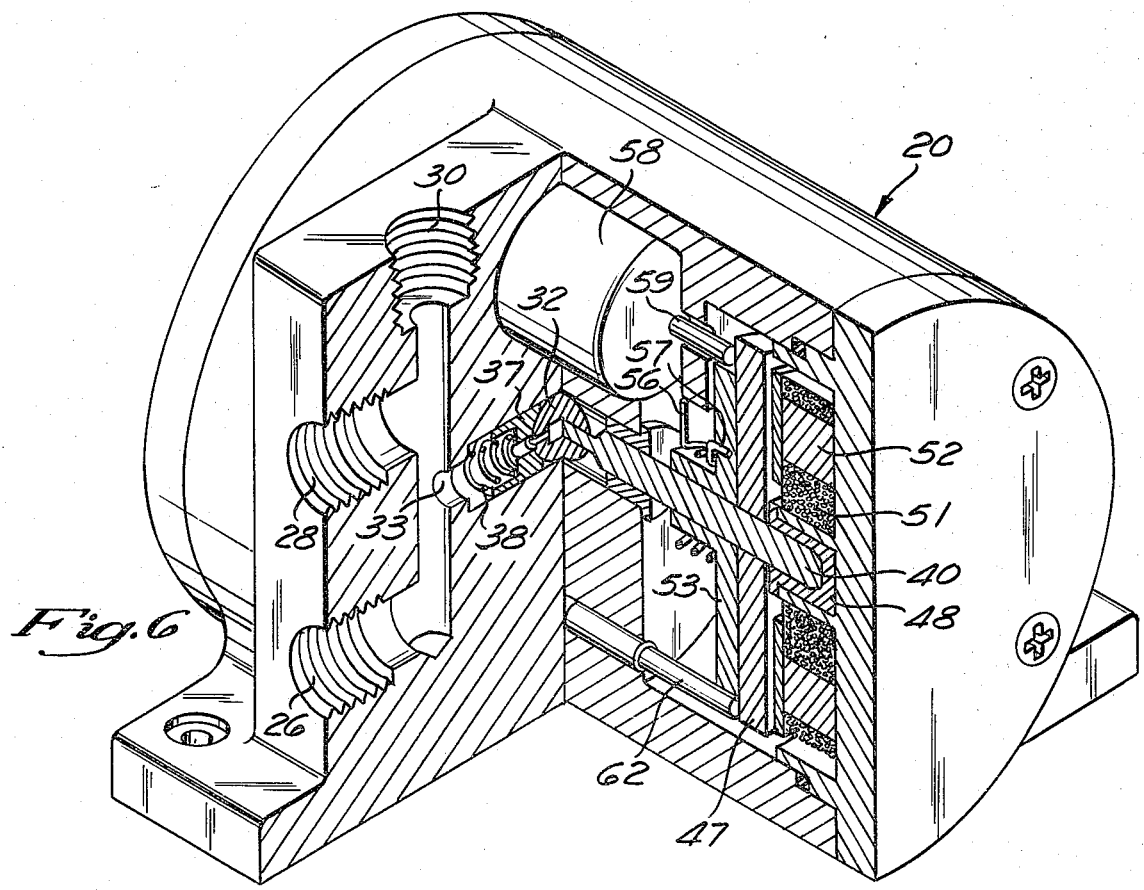
FIG. 6 is a perspective view of this brake valve broken away along longitudinal and cross sectional planes to reveal details of the valve's construction.
Figure 4:
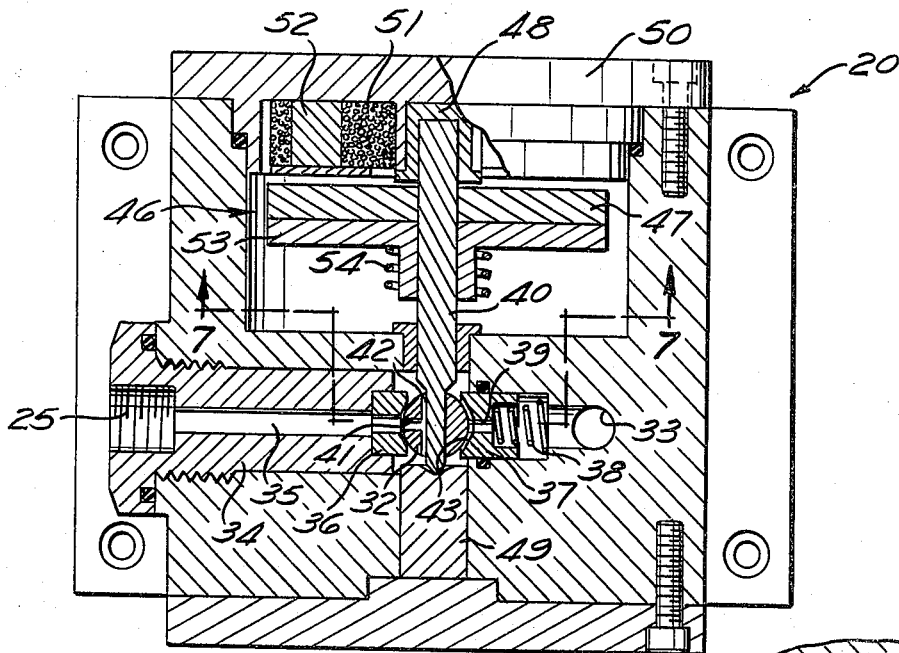
FIG. 4 is a longitudinal sectional view taken horizontally through the brake valve in the FIG. 3 brake system.

Referring to FIG. 4, the valve 20 includes a ball valve member 32 located between the inlet port 25 and an outlet port 33. As shown in FIG. 6, the outlet port 33 is connected to each of the outlet connections 26, 28 and 30 of the valve. The valve has a plug 34 with an axial passageway 35 which communicates from the inlet port 25 through a fixed valve seat 36 with the ball valve member 32. On the other side of the ball 32, there is a movable valve seat 37 which is biased against the ball valve member 32 by a spring 38. The outlet port 33 communicates through an opening 39 leading through the movable valve seat 37 with the ball valve member 32.

The ball valve member 32 has a passage 41 which leads from the exterior of the ball to the hollow interior 42 of the ball. When the passage 41 registers with the opening 35, hydraulic fluid can flow through the passage 41 into the hollow interior 42 of the ball. From there, the fluid can escape around the shaft 40 into the hollow interior of the valve such that the interior of the valve is wet with hydraulic fluid.

The movable valve seat 37 has a groove 43 in its face such that the hydraulic fluid can flow from the interior of the valve through the groove 43 to the outlet opening 39. Thus, when the passage 41 registers with the opening 35, as shown in FIG. 4, the valve is open, and fluid can flow between the inlet port 25 and the outlet port 33. When the ball 32 is in the position shown in full lines in FIG. 5, the blocking portion 44 of the ball 32 registers with the opening 35. The tangent point of the ball is separated by an angle X from the axis 45 of the ball, and the passage 41 is beyond the angle X so the blocking surface 44 closes the valve. The axis of the passage 41 is separated from the axis 45 of the ball by the angle Y which is greater than the angle X.

Figure 5:
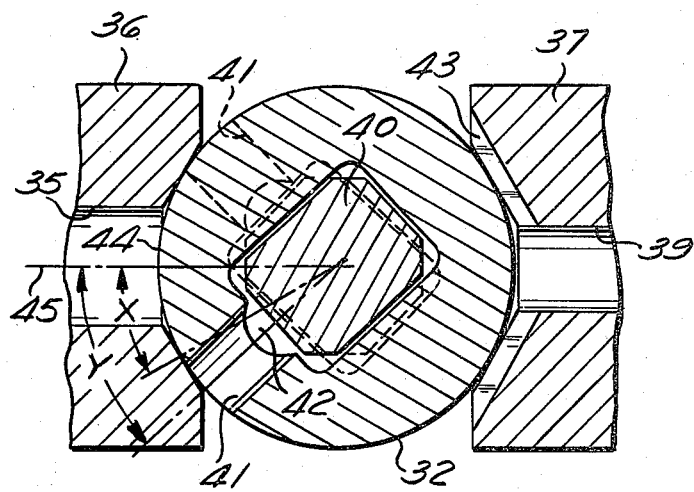
FIG. 5 is an enlarged cross-sectional view of the ball valve member in this brake valve.

When the passage 41 is rotated to the position shown in dashed lines in FIG. 5, the passage 41 is also beyond the tangent point of the ball, so the valve is closed in this position also. When the valve is in either of the closed positions just described, an increase of the pressure in the inlet opening 35 will force the ball 32 away from the fixed valve seat 36 so that hydraulic fluid will flow through the outlet groove 43 and the outlet opening 39.

When the valve is open (the passage 41 registering with opening 35) the brakes of the vehicle illustrated in FIG. 3 may be applied by the brake pedal in the normal braking action.

When the passage 41 is in the full-line position shown in FIG. 5, the valve is closed, and the valve performs a unidirectional check valve function such that when the brake pedal is depressed, the brakes will be applied, and any increasing pressure on the brake pedal will also be applied to the brakes. The pressure is trapped in the brake lines 27 and 29, so the brakes will remain applied. This function will be referred to herein as a creep control function since it prevents the vehicle from creeping.

When the passage 41 is in the dashed line position shown in FIG. 5, the valve is closed, and when the brakes are applied, the pressure of the hydraulic system will be trapped in brake lines 27 and 29 due to the check valve action of the ball 32. This function of the valve will be referred to as an anti-theft function, since the vehicle cannot be moved as long as the brakes are applied.

The hollow interior 42 inside the ball 32 is slightly larger than the shaft 40, and this gives the ball freedom to move away from the fixed valve seat 36 in the manner described.

The valve 20 includes a positioning device in the form of a motor and stops. The motor 46 (FIG. 4) includes a face-to-face polarized magnet 47 mounted on the shaft 40. The shaft 40 is journaled for rotation in bearings 48 and 49. Inside an end cap 50 on the valve an electrical coil 51 is wound about an annular core 52. Behind the magnet 47 a stop disc 53 of magnetic material is mounted on the shaft 40 for rotation. The disc 53 provides a return flux path for flux from the coil 51, and the end cap 50 also provides a return flux path. The disc 53 also serves as a stop as will be explained further.

When the coil 51 is energized with direct current, the flux exerts a force on the magnet 47 which causes the magnet, the stop disc 53 and the shaft 40 to rotate. The rotation of the shaft 40 also rotates the ball valve member 32. A spring 54 is mounted on the hub of the disc 53. One end 55 of the spring is affixed to the stop disc 53 (FIG. 6) and the other end is affixed to the central section 57 of the housing. Thus, the spring 54 provides force for returning the motor to its initial position when the coil 51 is de-energized.

A bistable solenoid coil 58 is mounted in the housing in the manner shown particularly in FIG. 6. This bistable solenoid coil operates a stop plunger 59 which serves as a movable male stop for cooperation with the stop disc 53. The stop disc 53 has circumferentially extending cut-out sections 60 and 61 in its periphery (FIG. 7) and the end shoulders of these cut-out sections serve as stop surfaces for the stop disc 53. Mounted in the housing there is also a fixed stop pin 62 (FIG. 6) which also cooperates with the stop disc 53. As may be seen particularly in FIGS. 7–9, the solenoid-operated stop plunger 59 is received in the cut-out section 60 of the stop disc 53, and the fixed stop pin 62 is received in the cut-out section 61 of the stop disc.

When the valve is in the open position (passage 41 registering with opening 35 as in FIG. 7) the solenoid-operated stop plunger 59 abuts against the stop shoulder 63 at one end of the cut-out section 60 on the stop disc, and the fixed stop pin 62 is at the center of the other cut-out section 61 on the stop disc. In this position, no power is applied to the coil 51. The bistable solenoid coil 58 is energized with a current of a polarity such as to extend the stop plunger 59 into the cut-out 60 in the stop disc. The spring 54 is urging the stop disc 53 in the clockwise direction as viewed in FIG. 7, and the stop shoulder 63 is engaged against stop plunger 59 to hold the valve in the open position.

As explained hereinafter, the electronic control for this braking system includes a key which must be inserted in order to activate the circuitry. When the key is in position and power is supplied to the motor winding 51, the motor 46 is energized to rotate the stop disc 53 and the ball valve member 32 to the position shown in FIG. 8. This is the creep control position. In this creep control position the solenoid-operated stop plunger 59 engages a stop shoulder 64 at the opposite end of the cut-out 60 in the stop disc 53, and the fixed stop pin 62 engages a stop shoulder 65 at one end of the cut-out 61 in the stop disc.

When the key is not in position in the electronic control system or the wires of the electronic control system are cut, power is not supplied to the motor winding 51. The bistable solenoid 58 is supplied with power of a polarity to retract the plunger 59 out of the cut-out 60, and the spring 54 causes the stop disc 53 and the ball valve member 32 to rotate clockwise to the position shown in FIG. 9. This is the anti-theft position. The stop disc is held in the anti-theft position by the engagement of the fixed stop pin 62 against the stop shoulder 66 at the opposite end of the cut-out 61 in the stop disc.

Thus, the valve of FIGS. 4–9 is a three-position valve which serves multiple functions. The valve is totally sealed, and only electrical connections emerge from the valve. The ball valve member is positioned by an internal positioning device including a motor and stops, as described.

CONTROL SYSTEM

Figure 1:
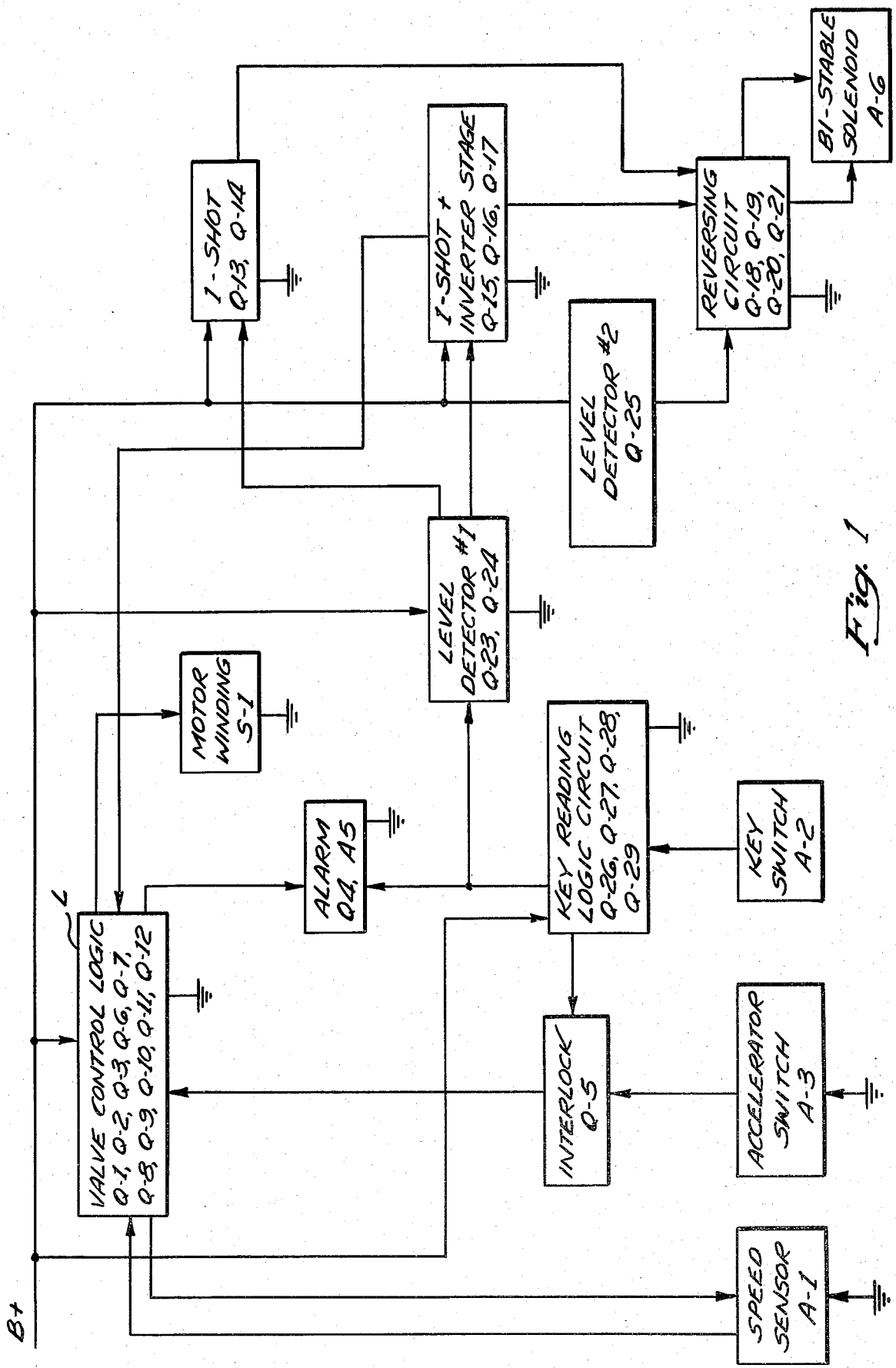
FIG. 1 is a schematic block diagram of the present control system.
Figure 2:
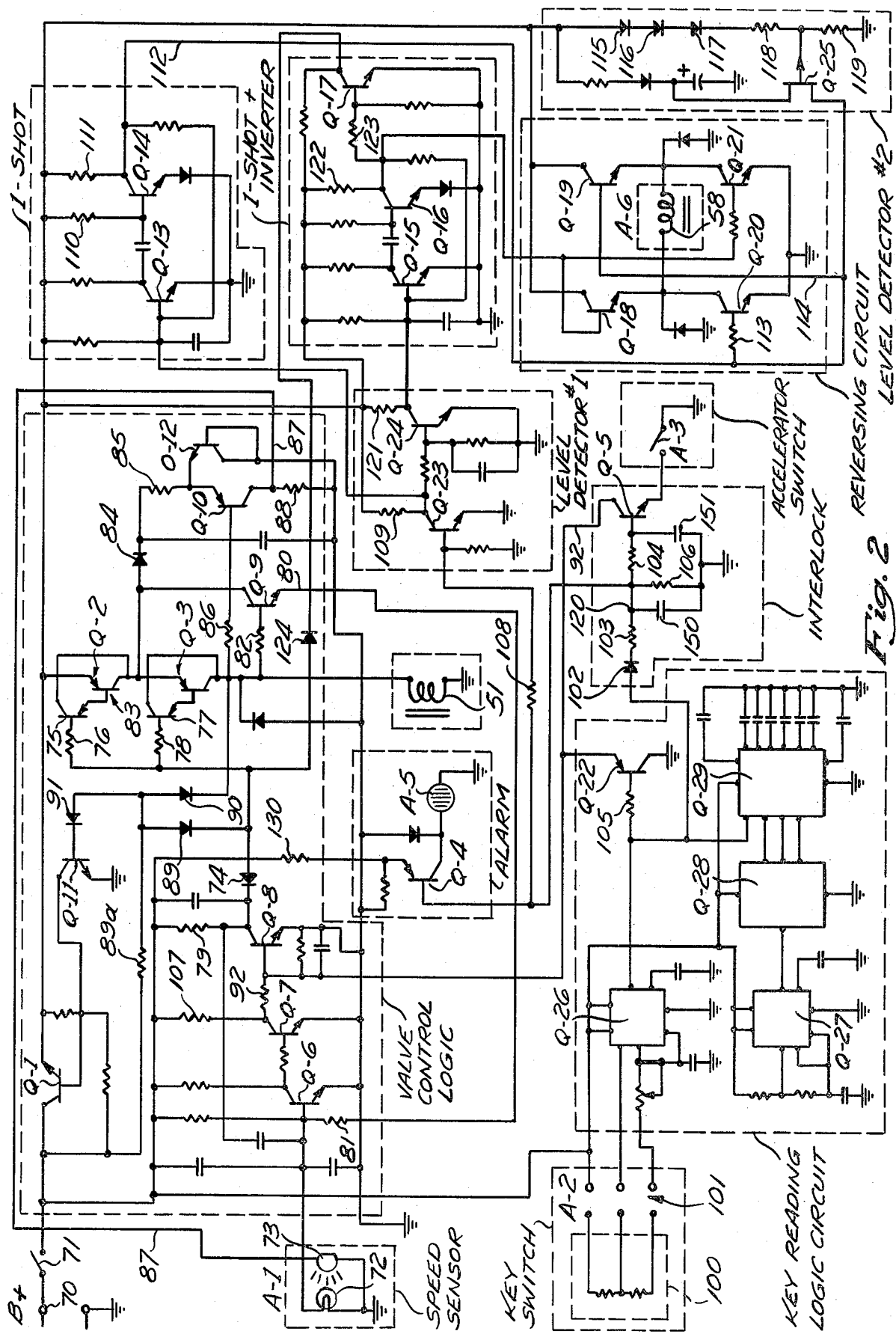
FIG. 2 is a detailed circuit diagram of this control system.

The electronic control system for the valve 20 is shown in block diagram form in FIG. 1 and in more detail in FIG. 2. It is under the control of a speed sensor A-1, which senses the speed of the vehicle and produces output pulses at a repetition rate proportional to the vehicle speed.

In one practical embodiment, the speed sensor includes a light emitting diode or other electrically energized light source, a rotatable sleeve in proximity to the LED which is coupled to the vehicle's speedometer cable to rotate in unison with it, and a photocell which senses light emitted by the LED and reflected from the rotating sleeve. The rotating sleeve has a non-reflective surface except at a circumferentially narrow line which is light-reflective to turn on the photocell (by reflecting light emitted by the LED) briefly during each rotation of the sleeve and the speedometer cable.

The electronic control circuit has a "valve control logic" section which is indicated by the block L in FIG. 1. The elements of the valve control logic section are contained within the correspondingly designated dashed-line box in FIG. 2. Included in this section are transistors Q1, Q6, Q7, Q8, Q9, Q10, Q11 and Q12, a first Darlington pair of transistors designated together as Q2, and a second Darlington pair designated together as Q3.

The positive terminal 70 of the vehicle battery is connected through the usual key-operated engine ignition switch 71 to the collector of Q1. The emitter of Q1 is connected through an emitter-collector path of Q2 and an emitter-collector path of Q3 to one terminal of the winding 51 of the motor 46 which controls the operation of valve 20, as already described. The opposite terminal of the motor winding 51 is grounded. It will be apparent that the motor winding 51 will be energized (to establish creep control operation of the brake system) when Q1, Q2 and Q3 are turned on.

When the vehicle is in motion, the photocell 72 in the speed sensor A-1 will be activated by pulses of light emitted by the LED 73 in the speed sensor A-1 and reflected by the transparent line on the sleeve which is rotating with the speedometer cable. Each time the photocell is so activated, it acts as a momentarily grounded switch.

VALVE CONTROL LOGIC

Transistor Q6 is biased to conduction, but it is turned off each time the photocell is activated, due to the connection of the photocell to the base of this transistor. When the vehicle is moving at a significant speed, Q6 will be kept turned off by the rapid ground pulses it receives from the speed sensor A-1.

Transistor Q7 is biased to a non-conductive state when Q6 is conducting, and it is turned on when Q6 is turned off. Transistor Q8 is biased to a conductive state when Q7 is non-conductive, and it is turned off when Q7 turns on.

The collector of Q8 is connected through a diode 74 to the base electrode of a transistor 75 in the first Darlington pair Q2 via a resistor 76, and to the base electrode of a transistor 77 in the second Darlington pair Q3 via a resistor 78. The collector of Q8 is connected to the positive battery terminal 70 through the ignition switch 71 and a resistor 79. When Q8 is non-conductive, the base electrodes of transistors 75 and 77 receive positive potential through a diode 89 and a resistor 89a. Consequently, Q2 and Q3 are turned off at this time, disconnecting the battery from the motor winding as long as the speed sensor A-1 is keeping Q6 off.

When the vehicle is braked to a stop, the rate at which negative-going pulses are produced by the photocell 72 in the speed sensor A1 diminishes enough to enable Q6 to conduct. This causes Q7 to turn off and Q8 to turn on. Q8 applies a negative potential to the base of transistor 75 and to the base of transistor 77, turning on Q2 and Q3 to supply power to the motor winding 51 so as to establish the creep control mode in the braking system. When the motor winding 51 is energized, it rotates the ball valve member 32 in the brake valve 20 (against the bias of spring 54) to the creep control position shown in FIG. 8. This is the full line position in FIG. 5, in which the ball valve member 32 acts as a one-way check valve to trap brake fluid pressure in the brake lines 27 and 29.

When Q2 and Q3 first turn on, they turn on Q9 to provide positive feedback via line 80 and resistor 81 to the base of Q6, thereby putting Q6 into full conduction. As shown Q9 has its base electrode connected by a resistor 82 to the ungrounded end of the motor winding 51, its collector connected to the collector of the second transistor 83 in the Darlington pair Q2, and its emitter connected to line 80.

When Q2 and Q3 turn on, they also turn off Q10, which has its emitter connected to the collector of transistor 83 in Q2 via a diode 84 and a resistor 85, its base connected via a resistor 86 to the ungrounded end of the motor winding 51, and its collector connected via line 87 to the LED 73 in the speed sensor A-1. Consequently, when Q10 turns off, it causes the LED 73 to turn off, so that even if the vehicle stops with the photocell 72 in an activated (i.e., circuit-closing) condition the base of Q6 will remain positive and Q6 will remain in full conduction.

Q12 functions as a voltage regulator for Q10. The emitter of Q12 is connected directly to the emitter of Q10. The base and the collector of Q12 are grounded. A resistor 88 is connected between the collector of Q10 and ground.

Short circuit protection for Q2 and Q3 is provided by transistor Q11 and diodes 89, 90 and 91, connected as shown. If both Q2 and Q3 are shorted out (for example, due to excessive heat) transistor Q11 will turn off transistor Q1 to interrupt the power supply to Q2 and Q3. Once Q1 is turned off, it will remain off regardless of whether or not the the positive terminal of the battery is connected to its collector.

With the motor winding 51 energized and the brake system in its creep control mode, brake pressure remains applied to the brakes 21 and 22 (FIG. 3) even after the vehicle stops and the brake pedal is released. This condition prevails as long as the driver of the vehicle does not depress the accelerator pedal, leaving the accelerator switch A3 in FIGS. 1 and 2 open.

INTERLOCK

Referring to FIG. 2, when the driver depresses the accelerator pedal and thus closes switch A-3, transistor Q5 in the "interlock" block in FIG. 2 is turned on. The collector of Q5 is connected through line 92 to the base of Q8 in the "valve control logic" block. The emitter of Q5 is connected to ground through the accelerator switch A3. The base of Q5 is connected to the output of the "key reading logic circuit" through a diode and resistors 103 and 104, all in series. A resistor 106 is connected between ground and the junction point between resistors 103 and 104. A capacitor 150 is connected in parallel with resistor 106. A capacitor 151 is connected between the base of Q5 and ground.

KEY READING LOGIC

Referring to the "key reading logic circuit" block in FIG. 2, Q26 and Q27 are signal generators of known design. Q26 generates the same frequency signal as Q27 if the key switch A2 is closed by having the correct electronic key 100 inserted in the key receptacle 101. When this key is inserted, a counter Q28 of known design counts pulses produced by Q27 and divides their frequency. Q29 is a digital-to-analog converter which converts the divided pulse frequency to a proportional analog output signal which is applied through diode 102 and resistors 103 and 104 to the base of Q5, causing it to conduct.

Accordingly, when the accelerator switch A3 is closed, the base of Q8 in the "valve control logic" block is grounded. This causes Q8 to turn off, and as a consequence Q2 and Q3 are turned off to de-energize the motor coil 51. The ball valve member 32 in the brake control valve 20 is returned by spring 54 from its creep control position (FIG. 8) to its open position, (FIG. 7), and therefore the normal braking mode is re-established in the braking system. During this time the stop plunger 59 is in its extended position and it is received in the peripheral groove 60 in the stop disc 53.

Figure 9:
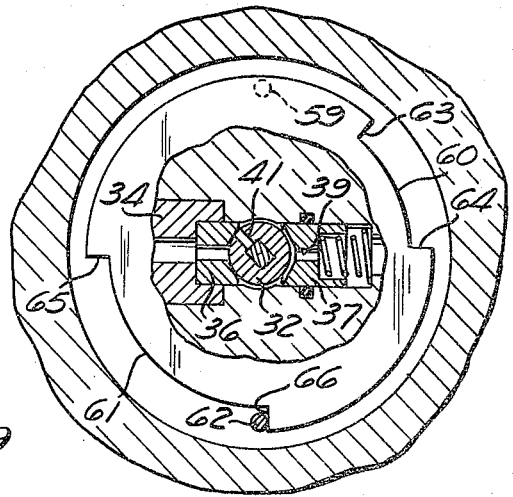
FIG. 9 is a view similar to FIGS. 7 and 8 and showing the ball valve member in its "anti-theft" position.

When the key 100 is removed or the ignition switch 71 is opened, the bistable solenoid 58 is energized with a polarity to retract the stop plunger 59 away from the stop disc 53, and the spring 54 rotates the stop disc 53 to the anti-theft position shown in FIG. 9. In this position, the valve 20 is closed and brake pressure is trapped in the brake lines 27 and 29, so that the brakes 21 and 22 will remain applied.

In the case of removal of the key 100, the foregoing action takes place as follows:

With the ignition switch 71 still closed, the positive battery terminal remains connected to the control circuit. The transistor Q22 in the "key reading logic circuit" block has its base connected to ground through resistor 105, diode 102, resistor 103 and resistor 106. The emitter of Q22 is connected to the positive battery terminal through resistors 92 and 107. The collector of Q22 is grounded. Upon removal of the key 100, Q22 conducts and grounds the base of Q8 in the "valve control logic" block. Since Q8 now is turned off, Q2 and Q3 are also turned off, and the motor coil 51 is de-energized.

LEVEL DETECTOR #1

Referring to the "level detector #1" block in FIG. 2, the base electrode of transistor Q23 is connected to ground through resistors 108 and 106. While key 100 is in the key receptacle 101, this base electrode is at a positive potential and Q23 is conducting. The emitter of Q23 is grounded, and its collector is connected to the emitter of now-conducting Q1 through a resistor 109.

1-SHOT AND REVERSING CIRCUIT

The collector of Q23 also is connected directly to the base of a transistor Q13 in the "1-shot" block, and while Q23 is on it grounds the base of Q13 and keeps Q13 turned off. A second transistor Q14 in the "1-shot" block is biased on by resistors 110 and 111, connected respectively to its base and collector, as long as Q13 remains non-conductive. The collector of Q14 is connected via line 112 and resistor 113 to the base of a transistor Q20 in the "reversing circuit" block in FIG. 2, and while Q14 is conducting, Q20 is kept off. The collector of Q14 is connected via lines 112 and 114 to the base of transistor Q19 in the "reversing circuit" block so that while Q14 is on, Q19 is off. Therefore, Q19 and Q20 are off while the key 100 is in the key receptacle.

Upon removal of the key 100 from the key receptacle, Q23 is turned off, Q13 is turned on, Q14 is turned off, and Q19 and Q20 are turned on to complete an energization path for the solenoid 58. At this time, the collector of Q23 becomes more positive, placing positive potential on the base of Q13 to turn it on. When Q14 turns off, its collector becomes positive and applies a positive potential to the base of Q19 and to the base of Q20, turning them on. The positive current flow through the solenoid 58 from right to left in FIG. 2 causes it to retract the stop plunger 59.

Such energization of the solenoid 58 last only briefly, after which it is automatically de-energized. This happens because Q13 remains on and Q14 remains off only for a short time period, as determined by the resistance and capacitance values of the circuit elements in the "1-shot" block in FIG. 2. After this time period, Q13 turns off and Q14 turns on, and consequently Q19 and Q20 are turned off to break the energization circuit for the solenoid 58. However, the valve 20 remains in its anti-theft position (dashed lines in FIG. 5; full lines in FIG. 9) in which the ball valve member 32 acts as a one-way check valve which traps brake fluid in the brake lines 27 and 29.

If the car engine is started now without the key 100 being inserted in the key receptacle 101, the brakes will remain locked. The absence of the proper key 100 in the key receptacle 101 causes Q22 in the "key reading logic" block to be on, causing Q8 to be off and Q2 and Q3, as well. Consequently, the motor winding 51 is not energized and the ball valve member 32 will not be rotated from its anti-theft position (FIG. 9).

In the case of opening of the ignition switch 71, such energization of the solenoid 58 takes places as follows:

LEVEL DETECTOR #2

Series-connected diodes 115, 116 and 117 and resistors 118 and 119 in the "level detector #2" block in FIG. 2 are connected between the emitter of Q1 and ground. When Q1 turns off as a result of the ignition switch being opened, the decaying voltage is sensed by this circuit and a diminished voltage is applied to the base of a field effect transistor Q25. Q25 turns on and it applies a positive potential via line 114 to the base of Q19 and via resistor 113 to the base of Q20, turning on both Q19 and Q20. This completes the path through the solenoid coil 58 for current of the proper polarity to cause it to retract the stop plunger 59. With the ignition switch 71 open, the motor winding 51 is not energized, so once the stop plunger 59 is retracted the spring 54 rotates the ball valve member 32 to the anti-theft position (FIG. 9).

If the car engine is started with the key 100 in the receptacle 101, Q13 remains off, Q14 remains on, and Q19 and Q20 remain off. Q23 is on, as described, and it keeps Q13 off by grounding its base.

At this time two actions must take place in the braking system to enable the car to move.

(1) the ball valve member 32 must be rotated from the anti-theft position shown in FIG. 9; and
(2) the stop plunger 59 must be extended by the solenoid coil 58 into the cutout 60 in the stop disc 53.

The required rotation of the ball valve member 32 is accomplished as follows:

1 SHOT + INVERTER

The base of Q22 in the "key reading logic" block receives a positive potential from Q29, keeping Q22 off. The junction 120 among resistors 103, 104 and 106 in the "interlock" block now is positive, turning on Q23 in the "level detector #1" block. This causes Q24 to turn off, enabling a positive potential to be applied to the base of a transistor Q15 in the "1-shot+inverter" block in FIG. 2 from the emitter of the now-conducting Q1 through a resistor 121. When Q15 is on, Q16 is off, allowing positive potential to be applied to the base of Q18 and Q21 in the reversing circuit block for solenoid 58. Consequently, Q18 and Q21 turn on and complete a path for positive current flow through solenoid 58 from left to right in FIG. 2. (It will be noted that this current polarity is opposite to the current polarity which caused the solenoid coil to retract its stop plunger 59.) The now-energized solenoid moves its plunger 59 to an extended position (i.e., toward the stop disc 53).

With Q16 off, its collector is at a positive potential through resistor 122 which connects it to the emitter of Q1. The base of Q17 receives a positive potential by way of resistor 122 and resistor 123, so Q17 turns on. This causes the collector of Q17 to be grounded, placing substantially ground potential on the base of transistor 75 in Q2 and the base of transistor 77 in Q3 through a diode 124 and the respective resistors 76 and 78. Consequently, Q2 and Q3 are turned on, energizing the motor winding 51 while the solenoid coil 58 remains energized with current of a polarity to cause it to extend the stop plunger 59.

Such energization of the motor winding causes it to rotate the ball valve member 32 and the stop disc 53 from the anti-theft position (FIG. 9) to the creep control position (FIG. 9). The extended stop plunger 59 snaps into the peripheral groove 60 in the stop disc 53 as soon as the stop shoulder 63 on the disc moves past it.

After a predetermined time interval determined by the resistance and capacitance values in the "1-shot+inverter" block, Q15 and Q16 will return to a conducting state of Q15 and a non-conducting state of Q16, and Q17 will turn off. Consequently, Q18 and Q21 will stop conducting and the solenoid coil 58 will be de-energized. Also, Q2 and Q3 will turn off and the motor coil 51 will be de-energized.

Figure 7:
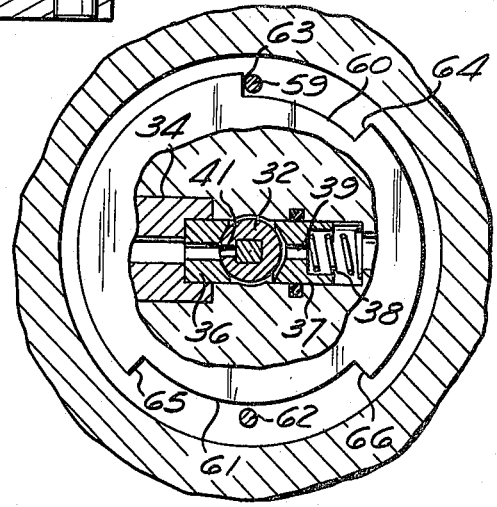
FIG. 7 is a cross-sectional view taken along the line 7—7 in FIG. 4, showing the ball valve member in its "normal braking" position.

When the key 100 is inserted in the key receptacle 101 and the vehicle engine is started, the base of Q5 in the "interlock" block receives a positive potential through resistors 104 and 103 and diode 102 from the output of Q29 in the "key reading logic" block, and this causes Q5 to turn off. The collector of Q8 goes positive, through resistor 79 which connects it through the ignition switch 71 to the positive battery terminal. Consequently, the base of transistor 75 in Q2 and the base of transistor 77 in Q3 go positive, turning off Q2 and Q3 and de-energizing the motor coil 51. The ball valve member 32 is rotated by spring 54 from the creep control position (FIG. 8) to the normal open position (FIG. 7).

ALARM

If someone attempts to start the car without having inserted the proper key 100 in the key receptacle 101, the output of Q29 in the "key reading logic" block will not be positive and therefore junction point 120 in the "interlock" block will be grounded. The base of Q4 in the "alarm" block will be grounded, and Q4 will be turned on. The audible alarm device A5 will receive current from the positive battery terminal through the ignition switch 71, resistor 130, and the emitter-collector path of A4. The alarm device A5 will sound an audible alarm to indicate that an unauthorized person is attempting to drive the car.

The following summarizes the operation which takes place under various conditions:

Vehicle parked, engine off

The solenoid operated stop plunger 59 is retracted. The ball valve member 32 is in the anti-theft position (FIG. 9).

Normal start

Figure 8:
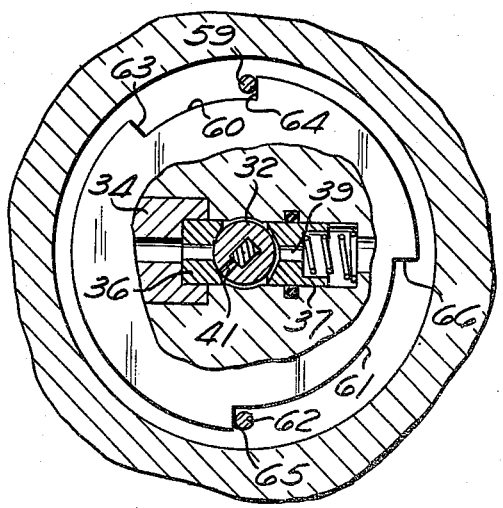
FIG. 8 is a view similar to FIG. 7 and showing the ball valve member in its "creep control" position.

The proper electronic key 100 is inserted in the key receptacle 101, and thereafter the ignition switch 71 is closed (by the usual key) and the vehicle engine is started. The motor coil 51 is energized, causing the ball valve member 32 to rotate counterclockwise from the anti-theft position in FIG. 9. The solenoid plunger 59 is moved to its extended position by the energization of the solenoid coil 58 through Q18 and Q21, and it stops the ball valve member in the creep control position (FIG. 8).

Normal driving

By depressing the accelerator pedal of the vehicle, the driver closes switch A3 and this causes Q5 to turn on and Q8, Q2 and Q3 to turn off, de-energizing the motor coil 51. The spring 54 now rotates the ball valve member 32 clockwise in FIG. 8 from the creep control position shown there to the normal, open position shown in FIG. 7. At all significant vehicle speeds, the ball valve member 32 will be maintained in this position (i.e, the normal braking mode) because the pulses from the speed sensor A1 will be rapid enough to keep Q6 turned off, Q7 turned on, and Q8, Q2 and Q3 off. The solenoid coil 58 is de-energized because Q14 is conducting and Q16 is conducting. The stop plunger 59 is in its extended position.

Abnormal driving

If the key 100 is removed while the vehicle is in motion, Q23 and Q14 will be turned off, turning on Q19 and Q20 to complete an energization path for the solenoid coil 58 which causes it to retract the stop plunger 59 from the cut-out 60 in the stop disc 53. Consequently, with the motor winding 51 now de-energized, the spring 54 rotates the ball valve member 32 from the open position in FIG. 7 clockwise to the anti-theft position shown in FIG. 9. Consequently, the next time the brakes are applied they will remain locked because the ball valve member 32 now acts as a one-way check valve, as described.

Creep control

If the vehicle is braked to a stop at a stop light, for example, the speed sensor A1 will cause Q6 to turn on, Q7 to turn off, and Q8, Q2 and Q3 to turn on, so that the motor winding 51 will be energized. Against the bias of spring 54, the motor rotates the ball valve member 32 counterclockwise in FIG. 7 from the open position shown there to the creep control position shown in FIG. 8. (The stop plunger 59 is in its extended position.) Therefore, the brake valve 20 now acts as a one-way check valve, trapping brake fluid in the brake lines 27 and 29 to keep the brakes 21 and 22 applied and thereby prevent the vehicle from creeping forward. As soon as the accelerator switch A3 is closed again, the motor winding 51 will be de-energized and the spring 54 will return the ball valve member 32 to the open position (for the normal braking mode) shown in FIG. 7.

Normal parking

After the car is brought to a stop, the ignition switch 71 is opened and electronic key 100 is removed from receptacle 101. The opening of the ignition switch disconnects the entire electronic control system from its power supply (the vehicle battery). The solenoid coil 58 is energized briefly when Q19 and Q20 are turned on in response to Q23 turning off, Q13 turning on, and Q14 turning off. The solenoid coil, when thus energized, retracts the stop plunger 59 and permits the spring 54 to rotate the ball valve member 32 to the anti-theft position shown in FIG. 9. (At this time the motor coil 51 is de-energized because the ignition switch 71 is open.)

Anti-theft protection

If the vehicle engine is started with the ignition key or by a jumper without inserting the proper electronic key 100 in the key receptacle 101, Q22 in the "key reading logic" block will be off, causing Q8, Q2 and Q3 to be off, thereby preventing the motor winding 51 from being energized to rotate the ball valve member 32 from the anti-theft position shown in FIG. 9.

If the power supply wires to the control circuit are cut, the decaying power supply voltage is detected in the "level detector #2" block and FET Q25 is turned on. It turns on both Q19 and Q20, completing a circuit path through the solenoid coil 58 for current of a polarity which causes the solenoid coil to retract the stop plunger 59 (if it is not already in its retracted position as a result of the vehicle having been parked.) With the locking plunger 59 retracted, the spring 54 rotates the ball valve member 32 to the anti-theft position (FIG. 9).

We claim:

1. In an automotive vehicle brake system having hydraulic brake means, and valve means operatively connected to control the hydraulic pressure in said brake means, said valve means having an open first position in which it is operable either to relieve said hydraulic pressure or to apply a pressure increase to said brake means, said valve means having at least one additional position in which it acts as a one-way check valve operable to apply a pressure increase to said brake means but not to relieve pressure in said brake means, the improvement which comprises:
   electrically energizable means for controlling the position of said valve means;
   and control circuit means operatively connected to said electrically energizable means to effect the positioning of said valve means in said open position when the vehicle is moving and in said additional position after the vehicle stops.

2. A brake system according to claim 1, wherein:
   said valve means has two of said additional positions, in each of which it acts as a one-way check valve controlled by said electrically energizable means.

3. A brake system according to claim 2, wherein said valve means is movable in opposite directions, and further comprising:
   spring means urging said valve means in one direction; and wherein said electrically energizable means comprises:
   an electric motor operable when energized to urge said valve means in the opposite direction;
   and a solenoid having a reciprocable plunger movable between an extended position for limiting the movement of said valve means and a retracted position in which it does not limit the movement of said valve means.

4. A brake system according to claim 3, wherein said control circuit means is selectively operable:
   to de-energize said motor and energize said solenoid to extend its plunger so as to enable said spring means to urge said valve means in one direction toward said one position and to enable said plunger to stop said valve means in said one position;
   to energize said motor and energize said solenoid to to extend its plunger so as to urge said valve means in the opposite direction toward one of said additional positions and to enable said plunger to stop said valve means in said one additional position; and
   to de-energize said motor and energize said solenoid to retract its plunger so as to enable said spring means to urge said valve means in said one direction to the other of said additional positions.

5. A brake system according to claim 4, wherein said control circuit means includes means operable when the vehicle is in motion to de-energize said motor and energize said solenoid to extend its plunger.

6. A brake system according to claim 4, wherein said control circuit means includes means operable when the vehicle is stopped to energize said motor and energize said solenoid to extend its plunger.

7. A brake system according to claim 6, wherein said control circuit means also includes a switch operable by the acceleration pedal of the vehicle, and means operable in response to the operation of said switch to de-energize said motor while the solenoid plunger remains extended.

8. A brake system according to claim 4, wherein said control circuit means includes:
   a key-operated switch, and a key insertable to operate said switch;
   and means operable when said key is not inserted to de-energize said motor and energize said solenoid to retract its plunger.

9. A brake system according to claim 8, wherein said key-operated switch is the ignition switch for the vehicle engine.

10. A brake system according to claim 8, wherein said control circuit means also includes a key-operated ignition switch for the vehicle engine which is separate and distinct from said first-mentioned key-operated switch.

11. A brake system according to claim 4, wherein said control circuit means comprises:
    a key-operated ignition switch for the vehicle engine;
    a second key-operated switch which is separate and distinct from said ignition switch;
    and means operable when either of said key-operated switches is open to de-energize said motor and energize said solenoid to retract its plunger.

12. A brake system according to claim 11, wherein said control circuit means includes means operable when both of said key-operated switches are closed and the vehicle is moving to de-energize said motor and energize said solenoid to extend its plunger.

13. A brake system according to claim 12, wherein said control circuit means includes means operable when both of said key-operated switches are closed and the vehicle is stopped to energize said motor and energize said solenoid to extend its plunger.

14. A brake system according to claim 13, wherein said control circuit means includes:
    a switch operable by the acceleration pedal of the vehicle;
    and means operable upon the closing of said accelerator pedal switch when both of said key-operated switches are closed to de-energize said motor while the solenoid plunger remains extended.

15. A brake system according to claim 1 in which said control circuit means includes:
    a selectively operable device;
    and means for positioning said valve means in said additional position when said selectively operable device is not operated.

16. A brake system according to claim 15 in which:
    said selectively operable device includes a key-operated switch, and a key insertable to operate said switch.

17. A brake system according to claim 15 in which said valve means is movable in opposite directions, and further comprising:
    spring means urging said valve means in one direction;

and wherein said electrically energizable means comprises an electric motor operable when energized to urge said valve means in the opposite direction.

18. A brake system according to claim 17 in which: said electrically energizable means further includes a solenoid having a reciprocable plunger movable between an extended position for limiting the movement of said valve means and a retracted position in which it does not limit the movement of said valve means.

19. A brake system according to claim 18 in which: said selectively operable device comprises a key-operated switch, and a key insertable to operate said switch.

20. A brake system according to claim 18 in which: said valve means has two of said additional positions in each of which it acts as a one-way check valve controlled by said electrically energizable means.

21. A brake system according to claim 20 in which said control circuit means is selectively operable to:
de-energize said motor and energize said solenoid to extend its plunger so as to enable said spring means to urge said valve means in one direction toward said one position and to enable said plunger to stop said valve means in said one position;
to energize said motor and energize said solenoid to extend its plunger so as to urge said valve means in the opposite direction toward one of said additional positions and to enable said plunger to stop said valve means in said one additional position; and
to de-energize said motor and energize said solenoid to retract its plunger so as to enable said spring means to urge said valve means in said one direction to the other of said additional positions.

22. A brake system according to claim 21 in which said control circuit means includes means operable when the vehicle is in motion to de-energize the motor and energize said solenoid to extend its plunger.

23. A brake system according to claim 22 in which said control circuit means includes means operable when the vehicle is stopped to energize said motor and energize said solenoid to extend its plunger.

24. A brake system according to claim 23 in which said means operable when the vehicle is in motion includes a switch operable by the acceleration pedal of the vehicle.

25. A brake system according to claim 15 in which said selectively operable device includes:
speed sensor means; and
a switch actuated by depression of the accelerator pedal of the vehicle.

26. A brake system according to claim 25 including:
spring means urging said valve means in one direction;
and wherein said electrically energizable means comprises an electric motor operable when energized to urge said valve means in the opposite direction.

27. A brake system according to claim 26 in which: said electrically energizable means further includes a solenoid having a reciprocable plunger movable between an extended position for limiting the movement of said valve means and a retracted position in which it does not limit the movement of said valve means.

28. A brake system according to claim 27 in which said control circuit means includes means operable when the vehicle is in motion to de-energize the motor and energize said solenoid to extend its plunger.

29. A brake system according to claim 28 in which said control circuit means includes means operable when the vehicle is stopped to energize said motor and energize said solenoid to extend its plunger.

* * * * *